5. COMPOSITIONS, COATING OR PLASTIC.
106/87
March 14, 1933.     C. K. ROOS     1,901,057
ACOUSTIC CORRECTIVE MATERIAL
Filed July 10, 1930
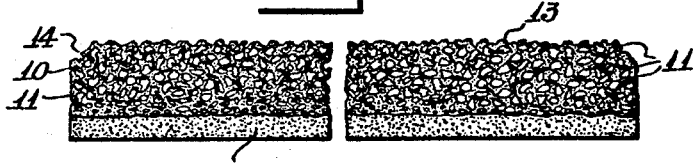
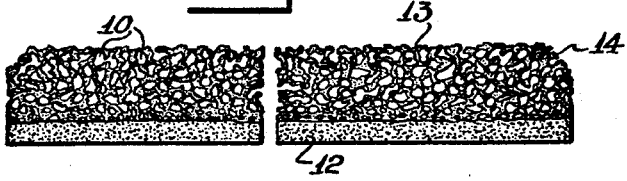 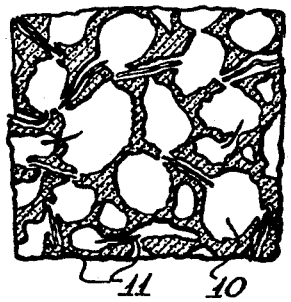
Dry Wood Fiber
Alpha Gypsum (see 1901057)
Calcium Carbonate
Aluminum Sulphate
Gum Arabic
   or Tragacanth
Dextrine
Sodium Bisulphate
Sodium Bicarbonate
INVENTOR
CARLISLE K. ROOS.
BY
L. A. Paley
ATTORNEY Patented Mar. 14, 1933

1,901,057

UNITED STATES PATENT OFFICE

CARLISLE K. ROOS, OF WHEATON, ILLINOIS, ASSIGNOR TO UNITED STATES GYPSUM COMPANY, OF CHICAGO, ILLINOIS, A CORPORATION OF ILLINOIS

ACOUSTIC CORRECTIVE MATERIAL

Application filed July 10, 1930. Serial No. 466,916.

This invention relates to acoustic corrective materials, and has reference more particularly to a composition of matter suitable for molding into so-called acoustical tile, for plaster or other products.

In the manufacture of tile or other molded products to be used for heat insulation, and where the composition contains gas-forming agents, it is desirable to have the individual cells formed by the gas in the plastic mix, completely enclosed by the cell walls so as to prevent convection air currents and to thus give the maximum heat insulation efficiency. However, for the manufacture of tile used for walls and ceilings for the purpose of acoustical correction and for absorbing sound to prevent echoes, it is desirable that the cells be inter-communicating one with another so as to secure maximum sound absorption. It is also desirable that the cell walls of the acoustical tile be of a high tensile and compressive strength so that crumbling or breaking of the tile will not be experienced during installation and use.

An object of this invention therefore is to provide a composition for acoustical tile and other materials in which the cells will be inter-communicating one with another.

Another object of the invention is to provide a cellular cementitious material for molding into acoustical tile, which will have high tensile and compressive strengths.

Reference is to be had to the accompanying drawing forming a part of this specification, in which Fig. 1 is an elevation of my improved acoustical tile after it has set, but before it has been dried out, Fig. 2 is an elevation of the finished tile after it has been dried out, Fig. 3 is a sectional elevation on a large scale of a portion of the tile, showing the character of the cell walls.

The formula for preparing my improved acoustical materials is compounded so that a minimum of gas entrainer is employed, thus insuring that the cells will be rather large and have a tendency to break down, leaving the cells inter-communicating. I desire to have the cells rather large so that the surface of the molded acoustical tiles may be painted after they become soiled in use without materially diminishing the sound-absorbing efficiency of the tile. In order to assist the breaking effect in the cell walls and to cause the cells to become inter-communicating, I add several per cent of dry wood fiber to the plastic mix, and these fibers pierce the cell walls and swell up, due to the water in the plastic mix, thus also aiding in the disruption of the cell walls. Upon drying out, the wood fibers shrink in diameter, thus tending to produce a larger hole surrounding each fiber and connecting the individual cells.

Another novel ingredient which is used in my improved composition is a product which I shall designate as "alpha gypsum". This alpha gypsum is described and claimed in the copending application of Randel and Dailey, Serial No. 384,343, filed August 9, 1929, and entitled, "High strength calcined gypsum". This product has the unique property of a high setting expansion of 0.25 to 0.4% on a consistency of 50% or less in the plastic mix. This high setting expansion also tends to disrupt the cell walls and cause the cells to be inter-communicating and thus having a higher sound absorption efficiency. This alpha gypsum has a compressive strength which is in excess of that of Portland cement, and ranges from 2500 to 6000 pounds per square inch, from a casting made at a pouring consistency of less than 50%. Because of the high strength of this alpha gypsum, the resulting acoustical tiles have a high resistance to breaking during installation and use, and are not subject to crumbling as is commonly experienced with porous acoustical tiles of this nature made from ordinary plaster of Paris. In spite of its high strength, the alpha gypsum has a setting time of 15 to 30 minutes which is advantageous in making molded acoustical products of low density.

This high strength calcined gypsum, or alpha gypsum, is manufactured by treating lumps of gypsum rock having a diameter of one-half inch to two inches, in a closed container with steam at 17 to 20 pounds gauge pressure. This steam calcination is carried on for a period of 4½ to 7 hours with a constant steam pressure, and with a constant withdrawal of water of condensation obtained from the heating steam, and also from the expelled water of crystallization. After calcination, the product is dried while maintaining at a temperature close to 212° F. and this product is ground so that 85% of same passes through a 100 mesh screen. The crystals of ordinary first settle calcined stucco when examined through the crossed nicols of a petrographic microscope, are seen to be very fine and needle-like, these crystals being mostly less than five microns in diameter. The crystals of the improved alpha gypsum, viewed through the same microscope are seen to be rather short, thick, and well formed. The crystals of alpha gypsum are practically pure calcium sulphate hemi-hydrate, and when viewed through a polarizing microscope, appear brilliantly colored, while little or no color effect is visible in the case of the tiny, needle-like crystals of ordinary plaster of Paris. Other properties of the alpha gypsum are fully described in the said co-pending application Serial No. 384,343.

The formula of my improved composition is as follows:

| | Pounds |
|---|---|
| Alpha gypsum | 2000 |
| Calcium carbonate | 57 |
| Aluminum sulphate | 89 |
| Gum arabic | 10 |
| Fine wood fiber | 44 |
| Water to bring to molding consistency. | |

The solid ingredients in the above formula are mixed together in any order, and when water is added to the powdered mixture, the calcium carbonate and aluminum sulphate react to produce carbon dioxide gas, which serves to puff up the plastic mass and introduce a multitude of gas cells 10 into the mix. Aluminum hydroxide and calcium sulphate are other products of this reaction.

The dry wood fiber 11 in the mixture pierces the cell walls and swells up due to the action of the water, thus causing the cell walls to be disrupted. Upon drying, the wood fiber shrinks, thus leaving a larger hole in the cementitious cell walls, these holes around the individual fibers serving to connect the individual cells and cause them to be inter-communicating for maximum sound absorption efficiency. Only a slight gas entraining action is desired, and this is accomplished by means of a gum arabic. By permitting some of the gas to escape from the soft molded mass, there is a tendency to make the cell walls still more inter-communicating. The high setting expansion of the alpha gypsum also aids in disrupting the cell walls and thus connecting up the individual cells.

The ingredients in the above formula may be varied somewhat as follows with varying success:

| | Pounds |
|---|---|
| Calcium carbonate | 20–100 |
| Aluminum sulphate | 30–150 |
| Gum arabic | 5–20 |
| Wood fiber | 25–75 |

Gum tragacanth or light colored dextrines may be substituted instead of the gum arabic. However, the gum arabic has a decided strengthening action for the finished set and dry composition. Sodium hydrogen sulphate and calcium carbonate may be used if desired to cause the generation of carbon dioxide. Sodium bicarbonate may also be used alone, as a gas generating agent, since this reacts with calcium sulphate of the alpha gypsum to produce carbon dioxide. Ordinary first settle calcined gypsum hydraulic cement and other cementitious materials may be used instead of alpha gypsum with less satisfactory results.

In molding the tile, a stiff backing sheet of plasterboard, fiberboard or other suitable sheet material, is placed in the bottom of a similarly-sized mold and the plastic cementitious mix is then poured on top of this backing sheet. When the mass has set to solid form, the tile is removed from the mold and placed in a suitable dryer until the cementitious material is thoroughly dry. The outer surface 13 of the tile which is exposed to the impinging sound waves, may be removed by buffing or abrading with a grinding wheel to expose the porous interior of the cells, and the exposed edges of the tile may be provided with bevels 14 for giving a pleasing appearance when the tile is applied to a ceiling or wall of a room.

I would state in conclusion that while the illustrated examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. An acoustical composition having approximately the following formula:

| | Pounds |
|---|---|
| Alpha gypsum | 2000 |
| Calcium carbonate | 57 |
| Aluminum sulphate | 89 |
| Gum arabic | 10 |
| Wood fiber | 44 |

2. An acoustical composition comprising:

| | Pounds |
|---|---|
| Alpha gypsum | 2000 |
| Calcium carbonate | 20–100 |
| Aluminum sulphate | 30–150 |
| Gum arabic | 5–20 |
| Wood fiber | 25–75 |

6. COMPOSITIONS, COATING OR PLASTIC.

3. An acoustical composition comprising alpha gypsum, a gas-forming agent, a strengthening agent, and wood fiber; the alpha gypsum and wood fiber being so proportioned relative to each other that they will mutually contribute toward the piercing of the cell-walls of the bubbles produced in the mass on gaging the same with water.

CARLISLE K. ROOS.

CERTIFICATE OF CORRECTION.

Patent No. 1,901,057.                                 March 14, 1933.

CARLISLE K. ROOS.

It is hereby certified that error appears in the printed specification of the above numbered patent requiring correction as follows: Page 3, after line 8, insert the following claims:—

4. A composition of matter capable when gaged with water of producing a sound-absorbing acoustics-correcting body, comprising alpha gypsum, a gas-forming agent, gum Arabic, and wood fiber; the alpha gypsum and wood fiber being so proportioned relative to each other that they will mutually contribute toward the piercing of the cell-walls of the bubbles produced in the mass on gaging the same with water.

5. A composition, that on gaging with water expands and sets into a connectedly porous sound-absorbing body, comprising alpha gypsum, a gas-forming agent capable of producing voids in said body, and wood fiber; the alpha gypsum and wood fiber being so proportioned relative to each other as to render the resulting voids intercommunicating with each other by piercing the cell-walls of the bubbles produced in the mass when the same is gaged with water.

And that the said Letters Patent should be read with this correction therein that the same may conform to the record of the case in the Patent Office.

Signed and sealed this 30th day of January, A. D. 1934.

F. M. Hopkins (Seal)                                          Acting Commissioner of Patents.